Nov. 24, 1970     G. A. WATSON     3,542,617
METHOD FOR PRODUCING A LEATHER-LIKE MATERIAL
Filed June 8, 1967
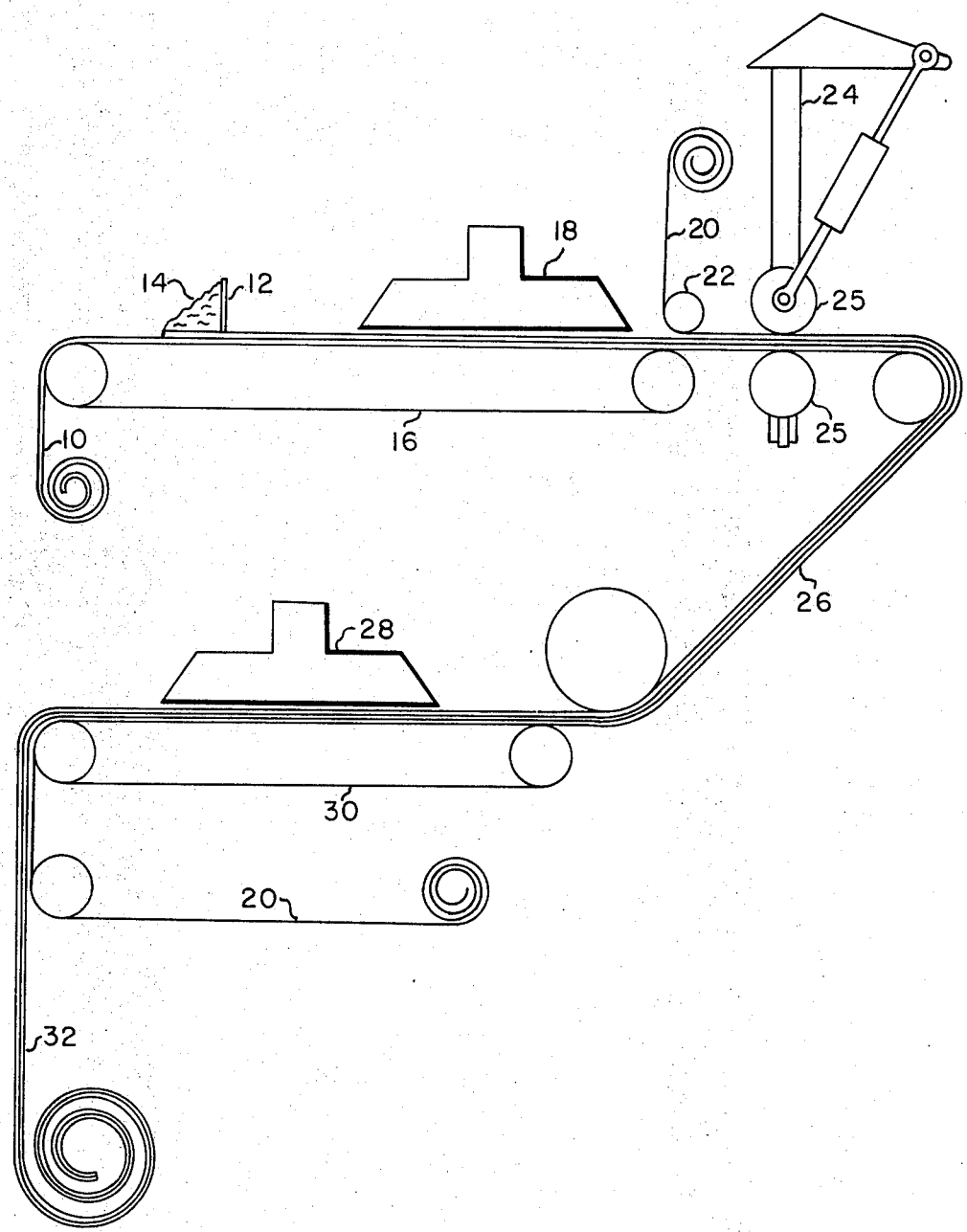
INVENTOR
GEORGE A. WATSON
BY *Herbert M Adrian Jr*
ATTORNEY

United States Patent Office 3,542,617
Patented Nov. 24, 1970

3,542,617
METHOD FOR PRODUCING A LEATHER-LIKE MATERIAL
George A. Watson, Charlotte, N.C., assignor to Fiber Industries, Inc., a corporation of Delaware
Filed June 8, 1967, Ser. No. 644,699
Int. Cl. B32b 27/36
U.S. Cl. 156—247              6 Claims

ABSTRACT OF THE DISCLOSURE

A method for producing a leather-like material by applying a relatively thick film of a viscous solution of a polyurethane elastomer to a flexible substrate, particularly a fibrous substrate wherein the resin is at least partially hardened by the evaporation of the solvent. A release sheet is applied to the partially hardened elastomer to form a laminate, the laminate being subsequently passed through a compression zone prior to the final curing of the polyurethane and the release sheet is removed after curing the polyurethane.

BACKGROUND OF THE INVENTION

Poromeric materials, which are synthetic leather-like materials, have recently become highly desirable and adequate substitutes for leather. With the increasing popularity of poromeric materials, the manufacturing demands for high quality material at increased production rates has resulted in considerable research in methods for reducing production time. Previously, poromeric production methods normally involved multi-step applications of a plurality of coatings to a flexible substrate. The coatings were applied in thicknesses of about 1 to 3 mils wet with at least partial curing between each coating application. The plurality of coatings was considered necessary to control the curing of the elastomer and the formation of a porous coating free of bubbles caused by entrapped solvent. The number of applied coatings and curing steps thus often ran as many as 25 or more, depending on the thickness of each applied coating and the total polymer coating thickness desired. While such methods resulted in very acceptable products, the time required for production was considerably increased with each coating application.

It is an object of the present invention to provide a method of producing a poromeric material at greatly reduced production times. It is another object of the present invention to produce a poromeric material of more uniform surface, color distribution, improved adhesion of the polymer to the substrate and with a reduction or elimination of pin holes, internal bubbles and other surface defects. These and other objects will become apparent to those skilled in the art from the description of the invention which follows.

SUMMARY OF THE INVENTION

In accordance with the invention, a method for producing a leather-like material is provided comprising coating a flexible substrate with a liquid mixture of poly urethane elastomer and a solvent in a wet film thickness of about 10 to 60 mils, removing a major proportion of the solvent from said partially polymerized polyurethane, applying a release sheet over said applied coating to produce a laminate, passing the laminate prior to final cure through a compression zone, applying a pressure of about 25 to 150 pounds per linear inch of nip onto said laminate, removing the residual solvent, further curing said polyurethane to a hardened tack free state and subsequently removing said applied release sheet from the surface of said polyurethane.

Utilizing the present method, the total thickness of the polymeric coating can be applied in a single application, thereby greatly reducing the time required for the production of a given quantity of poromeric material. Further, the present method provides the additional advantage of incorporating a convenient method of deep embossing the polymeric coating to give a surface finish corresponding to various leathers or other desired aesthetic patterns. By using an embossing die for the release sheet, embossing can be effected to the depth of the applied coating because the embossing is effected prior to a final cure of the polymer composition. The resulting embossed surface can be as deep as the polymer coating and is entirely permanent. Thus, this deep embossing is not lost even after extensive flexing or other end usage.

The invention will be described more fully by reference to the drawing which is a schematic illustrating a method of effecting the present invention.

The invention is effected by passing a flexible substrate 10, which is preferably a fibrous material, under a coating applicator 12 which applies a viscous solution of polymer 14 in a predetermined thickness onto the substrate. The substrate is supported by belt 16 which conveys the substrate and the applied coating to a solvent removal zone 18. A major proportion of the solvent is removed in solvent removal zone 18 by the application of heat, reduced pressure, air circulation and the like and combinations thereof. The coating of the material leaving the solvent removal zone 18 is still in a plastic state, but is of a hardness sufficient to withstand the subsequently applied pressure without being totally compressed into the substrate and/or does not form a rolling bank on applying said pressure. Preferably, the hardnes is sufficient to limit the compression into the substrate at less than about 10 percent.

Release sheet 20 is then applied onto the surface of the plastic polymer by means of roller 22. The resulting laminate is then passed to a compression zone such as a calender 24 comprising one or more pressure rollers 25, plate press or the like pressure application means. A pressure of about 25 to 150 pounds per linear inch is applied to the laminate thereby removing air, solvent bubbles, pin holes and the like from the plastic polymer. If desired, roller 22 can be eliminated wherein calender rollers 25 are used, with roller 25 serving a dual function of applying the release sheet and pressure.

In a preferred embodiment, the resulting laminate is then inverted to place the exposed flexible substrate surface in an uppermost position for further curing and solvent evaporation. Laminate 26 thus proceeds to a further solvent evaporative and curing step. The further curing is normally effected in the same manner as the solvent evaporation such as bypassing laminate 26 through curing zone 28 wherein heat, reduced pressure, air circulation and the like and combinations thereof or mere time lapse are used to remove the residual solvent from the polymeric coating upward through the flexible substrate. In this curing step, heat is often a preferred means for curing the polymer to a hardened state with the least expenditure of time. Temperatures of 35 to about 150 degrees centigrade are preferred. Conveyor 30 regulates the speed or residence time of laminate 26 in curing zone 28 and supports the laminate as it passes through said curing zone.

On completion of the curing, release sheet 20 is stripped from the polymer surface, leaving a smooth or embossed surface on the polymer, depending on the release sheet surface texture. The resulting poromeric material 32 is ready for use or for further treatment such as by the application of a top coating, sueding, removal of finely divided solid material from the polymeric material or the like finishing steps.

The flexible substrate on which the polymeric coating is applied may be most any flexible sheeting material such as paper, plastic and the like. Preferably, the substrate is porous to water vapor and more preferably the substrate is a water-vapor, porous, fibrous composition which may be woven, knitted, braided, twisted, nonwoven or the like synthetic or natural fibers, that is, animal, vegetable or mineral fibers or mixtures thereof. The particular substrate used is not critical to the invention although a porous nonwoven fibrous substrate permeable to water-vapor provides particularly desirable properties and is therefore highly preferred. Substrates of fibrous materials such as cotton, flax, jute, silk, wool, asbestos, nylon, rayon, acetate, triacetate, polyester, polyamide, polyethylene, polypropylene, polyurethane, acrylics, polyvinyls and the like fibers can be used as well as cellulose based substrates. The substrate may be bonded or nonbonded with a resinous material such as polyester, polyurethane, butyl rubber, melamine-formaldehyde resin and the like. Also, if desired, the fibrous material can be laminated with other fibrous materials or with a synthetic plastic sheet material.

The most preferred substrate is a nonwoven composition of synthetic fibers such as polyester staple and polypropylene staple, needled to a high density such as that obtained in needling a batting with about 1000 to 5000 or more punches per square inch. The needled substrate can be subsequently shrunk if desired. The prepared substrate is preferably of a thickness of about 0.005 to 0.3 inch and more preferably about 0.08 to about 0.2 inch thick. The tensile strength will be about 5 to 1600 pounds per square inch or more, and more preferably about 900 to 1200 pounds per square inch.

The denier of the structural fiber component can vary widely. It can be as great as about 30 denier per filament or more, but normally, fibers of about 0.5 to 3 denier per filament are preferred because they are easier to handle and give a product of greater pliability, toughness and scuff resistance.

The polymeric coating is preferably a polyurethane elastomer. The polyurethane elastomer used is preferably of a prepolymer type which can be cured or hardened to a flexible state by the removal of solvent, and/or further polymerization.

A preferred polymeric coating composition useful with the present invention is a polyurethane elastomer made by reacting an organic diisocyanate with an active hydrogen containing polymeric material such as a polyalkylene ether glycol, a hydroxyl containing polyester or a polyester-polyamide to produce an isocyanate-terminated polyurethane prepolymer and reacting the resulting prepolymer with a chain-extending compound having two active hydrogen atoms bonded to amino-nitrogen atoms. Hydrazine and N-methyl-aminobis-propylamine are typical chain extenders. However, others which are useful include dimethylpiperazine, 4-methyl-m-phenylene-diamine, m-phenylenediamine, 1,4-diaminapiperazine, ethylene diamine and mixtures thereof.

The polyurethane elastomer can be prepared by first mixing a molar excess of the diisocyanate with the active hydrogen containing polymeric material and heating the mixture at about 50 to 120 degrees centigrade until the prepolymer is formed. Or, the diisocyanate can be reacted with a molar excess of the active hydrogen containing polymeric material, and the reaction product capped by reacting it with more diisocyanate to form the prepolymer. Numerous variations of these basic reactions are known and can be used in the present process.

Aromatic, aliphatic and cycloaliphatic diisocyanates or mixtures thereof can be used in forming the prepolymer.

Polyester polyamides and polyalkylene ether glycols are the preferred active hydrogen containing polymeric materials for the prepolymer formation. The most useful polyglycols have a molecular weight of 300 to 5000, preferably 400 to 2000.

The polyesters and polyester polyamides are formed by conventional processes such as by reacting acids, esters or acid halides with glycols.

These glycols are reacted with aliphatic, cycloaliphatic or aromatic dicarboxylic acids or lower alkyl esters or ester forming derivatives thereof to produce relatively low molecular weight polymers, preferably having a melting point of less than about 70 degrees centigrade, and molecular weights like those indicated for the polyalkylene ether glycols. Acids for preparing such polyesters are, for example, succinic, adipic, suberic, sebacic, terephthalic and hexahydroterephthalic acids and the alkyl and halogen substituted derivatives of these acids.

The chain extension reaction is usually carried out at a temperature below about 120 degrees centigrade and often at about room temperature, particularly for hydrazine-extended polymers. During the reaction, prepolymer molecules are joined together into a substantially linear polyurethane polymer, the molecular weight of which is usually at least 5000 and sometimes as high as 300,000.

The polymeric coating composition is applied in a manner to form a porous continuous film over the flexible substrate. Various techniques can be utilized to achieve this end. One method, which is often preferred, is to incorporate a finely divided solid material into the polymeric coating prior to coating the substrate. The finely divided solid material is one which is insoluble in the coating composition and is nondeleterious to and nonreactive with the polymer or solvent therefor. Also, the solid material is one which can be readily removed from the polymer after curing by various means such as decomposition, volatilization, solubiligation or the like. The most preferred finely divided solvent materials incorporate in the coating composition are water or alcohol soluble compounds which do not fuse, decompose or volatilize at the curing temperatures utilized to cure the coating composition. Curing temperatures are normally below about 150 degrees centigrade and therefore useful solid materials can be any of numerous substances. However, the preferred materials are inorganic materials such as salts or mixtures of salts, especially alkali metal salts such as sodium and potassium chloride, bromides, sulfates, ammonium sulfates and the like, of which sodium chloride is the most preferred. However, materials which volatize above the curing temperature and below the polymer degradation temperature, such as ammonium acetate, can also be used with correspondingly good results.

The solid materials are preferably of a U.S. Standard Sieve Number less than about 60 and more preferably less than about 200 and more preferably that which passes through a U.S. Standard Sieve Number 325. The solid particles are incorporated in the polymeric coating material by various means such as by intimately mixing the solid particles and the polymer in a proportion by weight of about 1:1 to 6:1 and more preferably in a proportion of about 2:1 to 5:1 salt to polymer on the solid basis. The particular amount of solid material used in the particular particle size thereof effects the water permeability of the resulting product. A greater content of finely divided material increases the porosity of the finished product.

The prepared coating composition is applied to the flexible substrate by any of numerous methods, including spraying, brushing, spreading and the like. For example, particularly desirable methods are the floating knife method, calendering, cast coating, roller coating and the like. One of the more preferred methods is to use a doctor blade technique whereby the composition is applied as a viscous resin. The application is preferably of a wet thickness of about ⅓ to equal that sufficient to provide the desired dryed film thickness in the finally cured material. Thus, the coating is applied in a wet thickness of about 10 to about 60 mils, or more precisely about 10 to 30 mils in each application. Normally, a single application is preferred. However, a second or third application can be applied as may be desired, depending on the intended use of the end product and coating thickness desired therefor.

The resin is preferably applied as a viscous solution of prepolymer and curing agent diluted by a solvent for the prepolymer. The solvent used is preferably a volatile solvent which can be readily removed during the initial curing step prior to finally curing the polymer. Solvents such as methylethylketone, methylene chloride, benzene, toluene, xylene and the like aromatic and aliphatic solvent for the prepolymer are used. The solvent is used in a proportion by weight of the polymers to provide a resin viscosity suitable for the particular application technique. In applying a relatively thick film as is preferred in the present method, a relatively high viscosity of about 5000 to 500,000 centipoise is used and more preferably a viscosity of about 10,000 to 250,000 centipoise, depending on the resin system employed. The particular amount of solvent used varies with the type of solvent or combination (i.e., high boiling and low boiling) such as 90 percent methylethylketone and 10 percent toluene, the resin composition being solubilized, the amount of other additives such as pigments and pore forming materials and the like used in the coating mixture. Thus, the proportion of solvent can range from about 10 percent up to about 90 percent but more preferably the solvent content is in the range of about 25 to 60 percent by weight of the total composition.

The solvent is volatilized after application of the resin to the substrate by any of the various means such as subjecting to reduced pressure, increasing the temperature, passing air across the surface thereof and the like conventional means. During the solvent removal step, a major proportion of the low boiling solvent is removed, that is sufficient solvent is removed to produce a firm, non-flowing surface. Typically, a finally cured elastomer has a Durometer A hardness of about 75 to 90. The uncured material with a major proportion of the solvent removed has a hardness less than the cured such as about a Durometer A hardness of 20 to 80, depending on whether a solid pore forming material is present and the amount thereof. At this point, the surface normally is somewhat tacky because the elastomer has not been finally polymerized or cured to an insoluble rigid state. The term "major proportion" as used herein with respect to the solvent removal means at least 50 percent or more.

After removing a major proportion of the solvent, a release sheet is applied to the surface of the tacky polymer. The release sheet can be any of the various commercially available release papers such as a wax paper, paper coated with a non-adhering polymer or release agent, a plastic sheet or the like which does not adhere to the resin after final cure. In a more preferred embodiment, the release sheet has sufficient rigidity to serve as an embossing die or embossing sheet. Such embossing sheets contain a predetermined pattern or design. By passing the embossing sheet or die through the pressure zone, the desired embossing is transferred to the end poromeric product. Realistic finishes such as leather graining, alligator skin, calf skin and the like facsimilies of both natural and creative design are thus readily deep embossed on the surface of the polymeric coating while simultaneously removing undesirable surface defects, solvent and air bubbles to provide a uniform coating.

In the compression zone a pressure of about 25 to 150 pounds per linear inch of nip is applied onto the surface of the uncured polymeric coating. The pressure is applied against the release sheet and thus the release sheet conveys the pressure against the polymer surface. When an embossing die is used, deep embossing to a depth up to about 90 percent or more of the depth of the polymer coating is readily obtained. The pressure is applied by any of the various means such as calendering rolls, rollers, pressure plates or the like. However, because of the adaptability to continuous processing, calendering is preferred. In passing the coated material through such rolls, the solvent bubbles, pinholes, surface imperfections are more readily removed. Although pressures of 25 to 150 pounds per linear inch of nip are used, the more preferred pressures are in the range of about 40 to 100 pounds per linear inch, depending on amount of residual solvent. When calendering rollers are used, the resin coated product is passed through the rollers at a rate of about 1 to 20 feet or more per minute and more preferably at a rate of about 4 to 10 feet per minute. Higher and lower speeds can be used to coordinate the pressure application with the various other process steps such as the coating application, solvent removal and final cure.

On completion of the compressive step, the coated product is subjected to a further curing step wherein the residual solvent is removed and the resin finally polymerized or cured to a hardened state. Curing is effected under normal curing conditions for the particular polyurethane resin used. Such conditions include the application of heat up to a temperature of about 150 degrees centigrade for varying periods of time. This curing step is preferably effected while the release sheet is still in contact with the polymer coating. As a preferred embodiment, the laminate of flexible substrate, coating composition and release sheet is preferably inverted so as to have the flexible substrate in the upwardmost position during the curing step. In this manner the residual solvent volatilizing from the polymer coating will not produce additional blow holes, pin holes or the like on the surface of the polymer due to the tendency of the volatilized solvent to rise upwardly through the flexible substrate.

On completion of the curing step, the release sheet is removed cleanly from the polymer surface. When a release sheet having a polyurethane release agent or surface is utilized, the separation is clean without adhesion of the resin. The resulting poromeric material is then ready for subsequent processing such as the removal of the solid particles incorporated into the resin, the application of a top coating, dyeing and the like finishing steps. Alternatively, the removal of the solid particles can be effected prior to the removal of the release sheet if so desired.

The invention will be described more fully with reference to the following examples. Unless otherwise indicated, all parts and percentages used herein are by weight and all temperatures are in degrees centigrade.

EXAMPLE 1

A poromeric material was made in accordance with the present invention utilizing a needle punched nonwoven fabric comprised of a mixture of polyester and polypropylene staple. The process was effected in accordance with the drawing by applying a mixture of a polyester-polyamide diisocyanate prepolymer sold under the trademark of Daltoflex 1S, manufactured by Imperial Chemical Industries and Suprasec K2 polymerizing agent for the Daltoflex 1S sold by Imperial Chemical Industries dissolved in a mixture of 90 percent methylethylketone and 10 percent toluene to produce a mixture viscosity of 16,500 centipoise. The prepared polymer mixture was applied to the substrate using a knife edge applicator. The knife edge applicator was set 30 mils above the substrate to thereby apply a 30 mil wet film. The feed rate of substrate to the knife edge applicator was maintained at 5 feet per minute.

On applying a 30 ml wet coating of the polyurethane elastomer, the wet film and the substrate were conveyed to a solvent removal zone. In the solvent removal zone, warm air was circulated across the surface of the wet film to enhance the evaporation of the solvent. The air temperature was maintained at 57 degrees centigrade. A residence time of about 2 minutes removed a major proportion (about 80 percent) of the lower boiling methylethylketone solvent thereby producing a nonflowing tacky polymer surface having a Durometer A hardness of about 50 to 70. A release sheet having a calf embossing surface was then applied over the polymer coating to produce a laminate. The laminate was fed under a compression roller operated at an air pressure of 80 pounds per square inch fed to two four inch diameter air cylinders, one of which was located on each end of the roller shaft, thus producing an applied pressure of about 72 pounds per inch of nip on the laminate. The laminate withdrawn from the compression roller was then inverted to place the release paper face down and the exposed surface of the substrate uppermost. The laminate was then conveyed in this position to a curing zone wherein the urethane elastomer was cured to a finally hardened state at a temperature of 57 degrees centigrade. On completion of the curing, the release paper was removed from the polymer surface. The resulting poromeric material had a uniform calf embossed surface of a Durometer A hardness of 80, substantially free of pinholes, solvent bubbles, blow holes and other surface defects.

EXAMPLE 2

The process of the present invention was again effected in accordance with the drawing wherein the poromeric material produced in Example 1 was further coated with an additional 15 mils of the same polyurethane composition used in Example 1. However, in this example, the release paper used was Seville 40 which is a deeper embossing paper used to provide a deep, tooled leather-like surface. The laminate was again subjected to a compression force of about 72 pounds per linear inch of nip and subsequently further cured to a hardened state. On removal of the release paper and inspection of the poromeric, the surface thereof was found to be deep embossed and substantially free of pin holes and other defects.

EXAMPLE 3

A poromeric material was again made in accordance with the drawing, utilizing a polyurethane resin made in accordance with Example 1 wherein finely divided sodium chloride particles were incorporated into the resin in a ratio of 1:4 resin:salt based on the resin solids. The resin was diluted with a mixture of 90 percent methylethylketone and 10 percent toluene to a viscosity of 15,000 centipoise. The prepared polymer composition was applied to a nonwoven substrate comprised of a mixture of polyethylene and polypropylene staple needled to a high density having a 94 Sley nylon plain weave fabric applied over the substrate prior to the application of the polymeric coating. The polymeric coating was then applied over the fabric in a wet thickness of 20 mils. Again, a belt speed of 5 feet per minute was used.

The applied wet coating and substrate were then conveyed to a solvent removal chamber wherein about 75 to 85 percent of the lower boiling methylethylketone solvent was removed by subjecting the material to circulating air at a temperature of about 57 degrees centigrade. The polymeric material leaving the curing chamber was in a nonflowing tacky state. Again, calf embossed release paper was applied over the tacky polymer to produce a laminate and the laminate passed through compression rolls set to apply a pressure of about 72 pounds per linear inch of nip. In combination with the application viscosity and applied pressure, the polymer mixture penetrated the nylon fabric sufficiently to firmly bond it to the nonwoven substrate.

The laminate was then further cured to a finally hardened state by subjecting to a curing temperature of about 57 degrees centigrade. On completion of the cure, the embossing sheet was removed and the poromeric material was wahed in water to remove the sodium chloride from the polymeric coating. The resulting product was a high quality water-vapor permeable poromeric material substantially free of surface defects.

In the same manner, other polyurethane compositions are applied using compression pressures of about 25 to 150 pounds per linear inch of nip with correspondingly good results.

In the operation of the present process, the processing time required over previous multi-coat applications is reduced to less than about 20 percent without loss of quality in the end poromeric material.

While there have been described various embodiments of the present invention, the method described is not intended to be understood as limiting the scope of the invention as it is realized that changes therein are possible. It is intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A method for producing a leather-like material comprising coating a nonwoven fabric comprising a mixture of polypropylene and polyester fibers with a liquid mixture of a polyurethane elastomer and a solvent in a wet mil thickness of about 10 to 60 mils, removing a major proportion of the solvent from said polyurethane, applying a release sheet over said applied coating to produce a laminate, therewith passing the laminate prior to final cure through a compression zone, wherein a pressure of about 25 to 150 pounds per linear inch of nip onto said laminate is applied, removing the residual solvent and further curing said polyurethane to a hardened tack free state and subsequently removing said applied release sheet from the surface of said polyurethane.

2. The method of claim 1 wherein the release sheet is an embossing die.

3. The method of claim 1 wherein the pressure is applied in the compression zone by passing the laminate through a calendar.

4. The method of claim 1 wherein the solvent is a mixture of a low boiling solvent and a higher boiling solvent.

5. The method of claim 4 wherein the lower boiling solvent is methylethylketone and said solvent is substantially removed prior to the compression to produce a surface hardness of a Durometer A 20 to about 80.

6. A method for producing a leather-like material comprising coating a water-vapor permeable nonwoven needle punched fabric with a liquid mixture of a polyurethane elastomer and a solvent in a wet mil thickness of about 10 to 60 mils, removing a major proportion of the solvent from said polyurethane, applying a release sheet over said applied coating to produce a laminate, passing the laminate prior to final cure through a compression zone, applying a pressure of about 25 to 150 pounds per linear inch of nip onto said laminate, removing the residual solvent, inverting said laminate to place the nonwoven substrate uppermost after subjecting the laminate to the compression zone and effecting the further volatilization of the solvent and curing of the polyurethane in the inverted position to a hardened tack free state and subsequently removing said applied release sheet from the surface of said polyurethane.

References Cited

UNITED STATES PATENTS

| | | | |
|---|---|---|---|
| 3,255,061 | 6/1966 | Dobbs | 156—247 |
| 3,330,713 | 7/1967 | Watson et al. | 156—247 |

REUBEN EPSTEIN, Primary Examiner

U.S. Cl. X.R.

161—44, 231, 190; 117—80